Oct. 23, 1923.
J. M. BAILEY
SPECTACLES
Filed July 14, 1921
1,471,996
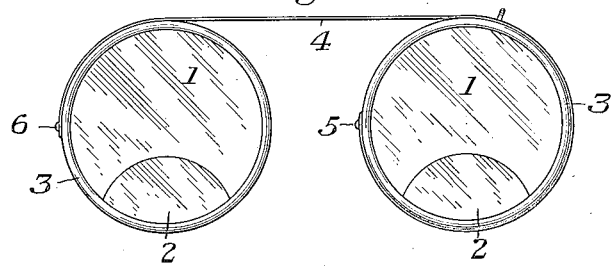
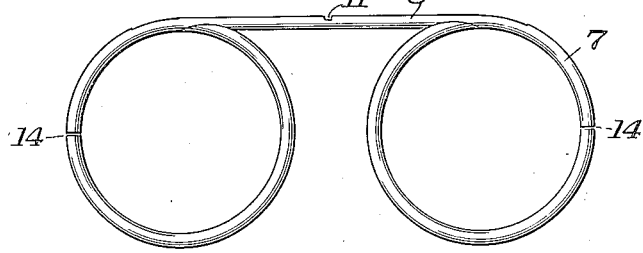
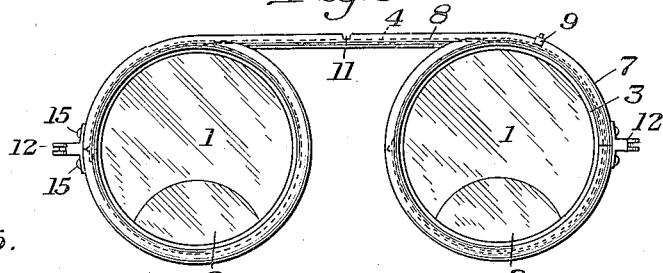
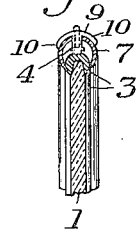
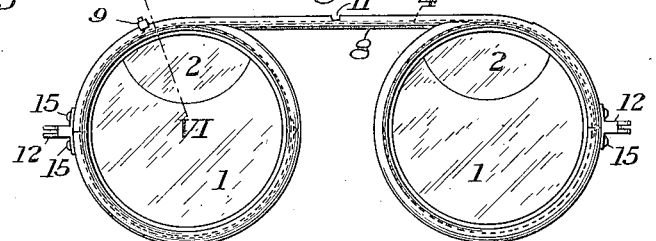
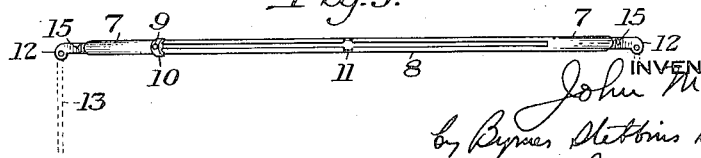
INVENTOR
John M. Bailey
by Byrnes Stebbins Burgess & Parmelee
his Attorneys Patented Oct. 23, 1923.

1,471,996

UNITED STATES PATENT OFFICE.

JOHN M. BAILEY, OF PITTSBURGH, PENNSYLVANIA.

SPECTACLES.

Application filed July 14, 1921. Serial No. 484,637.

*To all whom it may concern:*

Be it known that I, JOHN M. BAILEY, residing at Pittsburgh, Allegheny County, Pennsylvania, have invented a new and useful Improvement in Spectacles, of which the following is a full, clear, and exact description.

My invention relates to spectacles, and particularly to that class of spectacles known as "bifocals."

In the use of bifocal lenses, the wearer has difficulty in getting a clear view of the floor or street when walking because of the fact that the lower part of the bifocal lens is designed for reading. Therefore, a certain substantial region immediately in front of the wearer when walking is obscure, and in many instances, such conditions have led to accident by the wearer's falling, due to his inability to clearly observe this area.

The object of my invention is a simple arrangement whereby the bifocal lenses may be rotated so as to place the reading portion of the lenses at the upper part of the frame containing the lenses instead of at the lower part, thus removing the objections above noted.

A further object of my invention is to so arrange the parts as to cause a simultaneous rotation of the two lenses around an axis perpendicular to the surface of the lenses.

While my invention is specially applicable to spectacles, it is to be understood that the same mechanism may be applied to other optical instruments, wherein there are portions having different foci, and the word "spectacles," as used herein and in the claims, is intended to include such instruments.

Also, while the invention is illustrated in connection with a specific form of bifocal lense, it may be embodied in other multi-focal lenses, such as trifocal lenses.

My invention will be better understood by reading the following description, taken in connection with the accompanying drawings, forming a part thereof, in which:

Figure 1 shows an elevation of the lenses with the rims and connecting means attached;

Figure 2 shows an elevation of the frame;

Figure 3 shows a view with the lenses in normal position;

Figure 4 shows a view similar to Figure 3, with the lenses rotated;

Figure 5 is a top plan view of Figure 4;

Figure 6 is a detail partial section on the line VI—VI of Figure 4; and

Figure 7 is a perspective view of the operating device.

Referring to the drawings, each of the lenses has a portion 1 and a portion 2 of different foci. These lenses are mounted in rims 3, to which is attached a connecting member 4. The member 4 is attached to one of the lenses at 5, and to the other at 6 by any suitable means, such as a screw. The mechanism shown in Figure 1 is mounted in the frame 7, shown in Figure 2. By reference to the section shown in Figure 6, it will be seen that the frame 7 is open on the inside, so as to receive the rim 3. The opening in the frame 7 and the sides of the rims is such that the rims move freely in the frames, but are not loose enough to permit vibration or mis-alignment. The connecting member 4, which is attached to the lenses, extends through the bridge piece 8 of the frame 7, and the operating mechanism 9 is attached to the member 4 by any suitable means, and is provided with wings 10, which rest upon the bridge piece 8. The bridge piece 8 acts as a guide for the operating member 9, thus facilitating the rotation of the lenses. Without the wings 10 and guide 8, the rotative operation of the lenses would not be satisfactory, since the operating force is supplied to the outer end of the member 9; and in view of the fact that the member 4 is quite flexible, there would be a tendency to buckle the member 4 and change the relation of the lenses to each other. This is avoided by the arrangement shown in Figure 6. The bridge piece 8 is provided with a slot 11, for a reason which will appear later. The embodiment of the invention as shown in the drawings includes lugs 12, to which may be attached ear pieces 13, but my invention is by no means limited to that type of spectacles, but applies equally to nose glasses which are not provided with the parts 12 and 13.

The parts shown in Figures 1 and 2 are assembled as follows: The lenses are mounted in the rims in any desired manner. One end of the member 4 is passed through the slot 11 and bridge piece 8 until the left hand end, for example, as viewed in Fig. 2, extends through the break 14 provided in the frame 7. This end is then attached to one of the rims in any desired manner. This rim is then placed in its corresponding part of the frame by springing the frame sufficiently to permit the entry of the rim, and the other rim is similarly inserted. The free end of the member 4 is then passed through the bridgepiece into the right hand end portion of the frame, whereupon the parts would assume the position shown in Figure 3, for example. The left hand lug 12 would then be attached to the frame by placing the same so that one of the screws 15 would be on one side of the opening 14 and the other on the other side. The member 9 would then be moved to the position shown in Figure 4, whereupon the free end of the member 4 would come opposite the opening in the right hand frame 7. The screw 5 would then be placed in position to fasten the member 4 to the rim 3, whereupon the right hand lug 12 would be attached in the same manner as heretofore explained. This makes a simple assembly and produces an article which is rigid and durable.

When the wearer desires to read, the lenses would be in the position shown in Figure 3, and for walking or long distance view, the lenses would be rotated to the position shown in Figure 4, by moving the member 9 and rotating the lenses through the member 4.

While I have described one embodiment of my invention in detail, I desire it to be understood that I am not to be limited to the exact arrangement shown and described, as many detail changes may be made without departing from the spirit of my invention.

I claim:

1. In a device of the character described, the combination of a pair of lenses, each having portions of different foci, a frame in which said lenses are rotatably mounted, and means for rotating said lenses simultaneously around an axis perpendicular to the surface of the lenses, substantially as described.

2. In a device of the character described, the combination of a pair of lenses, each having portions of different foci, a frame in which said lenses are rotatably mounted, means connecting said lenses, and means for moving said connecting means to rotate said lenses simultaneously around axes substantially perpendicular to the surface of said lenses, substantially as described.

3. In spectacles, the combination of a pair of multifocal lenses, a frame for said lenses in which they are rotatably mounted, a bridge piece on said frame, means connecting said lenses together, and means guided by said bridge piece for operating said connecting means to rotate said lenses, substantially as described.

4. In spectacles, the combination of a pair of multifocal lenses, a rim for each lens, a frame for said lenses and in which said lenses are rotatably mounted, means connecting said rims to rotate the lenses simultaneously, and means for actuating said connecting means to rotate said lenses, substantially as described.

5. In spectacles, the combination of a pair of multifocal lenses, a rim for each of said lenses, a frame for said lenses, a bridge piece for said frame, means connecting said rims and extending through said bridge piece, and means mounted on said bridge piece and guided thereby for actuating said connecting means to rotate said lenses, substantially as described.

6. In an optical device, a pair of lenses each having portions of different foci, supporting means maintaining said lenses in operative relation, and means for simultaneously rotating said lenses within said supporting means, each lens being rotatable about an axis extending at an angle to the plane of the lens, substantially as described.

7. In an optical device, a pair of lenses each having portions of different foci, means maintaining said lenses in operative relation, and means for simultaneously rotating said lenses as units, each lens being rotatable about an axis extending at an angle to the plane of the lens and parallel to the axis of rotation of the other lens, substantially as described.

In testimony whereof, I have hereunto set my hand.

JOHN M. BAILEY.